(12) United States Patent
Gross et al.

(10) Patent No.: US 7,933,737 B2
(45) Date of Patent: Apr. 26, 2011

(54) ESTIMATING THE AMBIENT TEMPERATURE OF AIR OUTSIDE OF A COMPUTER SYSTEM

(75) Inventors: Kenny C. Gross, San Diego, CA (US); Aleksey M. Urmanov, San Diego, CA (US)

(73) Assignee: Oracle America, Inc., Redwood Shores, CA (US)

( * ) Notice: Subject to any disclaimer, the term of this patent is extended or adjusted under 35 U.S.C. 154(b) by 148 days.

(21) Appl. No.: 12/180,430

(22) Filed: Jul. 25, 2008

(65) Prior Publication Data
US 2010/0023295 A1    Jan. 28, 2010

(51) Int. Cl.
*G01K 7/00* (2006.01)
*G01K 11/00* (2006.01)
*G01K 17/00* (2006.01)

(52) U.S. Cl. .......................................... 702/130

(58) Field of Classification Search .................. 702/130, 702/132, 182; 374/100; 700/108–110
See application file for complete search history.

(56) References Cited

U.S. PATENT DOCUMENTS

| 2005/0216221 A1* | 9/2005 | Broyles et al. | 702/132 |
| 2009/0144014 A1* | 6/2009 | Aljabari | 702/130 |

\* cited by examiner

*Primary Examiner* — Michael P Nghiem
(74) *Attorney, Agent, or Firm* — Park, Vaughan, Fleming & Dowler LLP

(57) ABSTRACT

Some embodiments of the present invention provide a system that estimates an ambient temperature of air outside of a computer system. During operation, a temperature inside the computer system is measured for different flow rates of air into the computer system. Next, the temperature measurements are used to determine a relationship between the temperature inside the computer system and a parameter related to the flow rate of air into the computer system. Then, the ambient temperature of air outside the computer system is estimated based on the relationship.

17 Claims, 2 Drawing Sheets

ESTIMATING THE AMBIENT TEMPERATURE OF AIR OUTSIDE OF A COMPUTER SYSTEM

BACKGROUND

1. Field

The present invention relates to techniques for characterizing parameters of a computer system. More specifically, the present invention relates to a method and apparatus that estimates an ambient temperature of air outside of a computer system.

2. Related Art

Accurately determining the ambient temperature of air outside of a computer system can be very useful in diagnosing and controlling the operation of a computer system. However, typically the ambient temperature sensor for a computer system is located inside the computer system case so that the sensor is protected from physical damage during handling, installation, and routine use of the computer system. As a result of this ambient temperature sensor placement, the sensor may heat up as the computer system heats up. Additionally, when the speed of a cooling fan in the computer system changes, altering the flow of air into the computer system case, the temperature inside the case, and consequently the temperature sensed by the ambient temperature sensor, may be affected.

Hence, what is needed is a method and system that estimates an ambient temperature of air outside of a computer system, without the above-described problems.

SUMMARY

Some embodiments of the present invention provide a system that estimates an ambient temperature of air outside of a computer system. During operation, a temperature inside the computer system is measured for different flow rates of air into the computer system. Next, the temperature measurements are used to determine a relationship between the temperature inside the computer system and a parameter related to the flow rate of air into the computer system. Then, the ambient temperature of air outside the computer system is estimated based on the relationship.

In some embodiments, the different flow rates of air into the computer system include a maximum flow rate of air into the computer system, and estimating the ambient temperature of air outside the computer system includes projecting the temperature inside the computer system for an airflow rate higher than the maximum flow rate.

Some embodiments additionally include storing information based on the relationship between the temperature inside the computer system and the parameter related to the flow of air into the computer system.

In some embodiments, the parameter related to the flow rate of air includes at least one of: a speed of a fan in the computer system, a current used by the fan, a power used by the fan, a measured flow rate of air into the computer system, and an inferred flow rate of air into the computer system.

In some embodiments, the parameter related to the flow rate of air into the computer system is a parameter related to a reciprocal of the flow rate of air into the computer system. Moreover, estimating the ambient temperature of air outside the computer system includes estimating the ambient temperature of air outside the computer system based on the relationship between the temperature inside the computer system and the parameter related to the reciprocal of the flow rate of air.

In some embodiments, measuring the temperature inside the computer system for different flow rates of air into the computer system includes measuring the temperature inside the computer system for different flow rates of air into the computer system when the computer system is switched on.

In some embodiments, measuring the temperature inside the computer system for different flow rates of air into the computer system includes measuring the temperature inside the computer system for different flow rates of air into the computer system when a configuration of the computer system is changed.

DETAILED DESCRIPTION

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present description. Thus, the present description is not intended to be limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Figure 1:
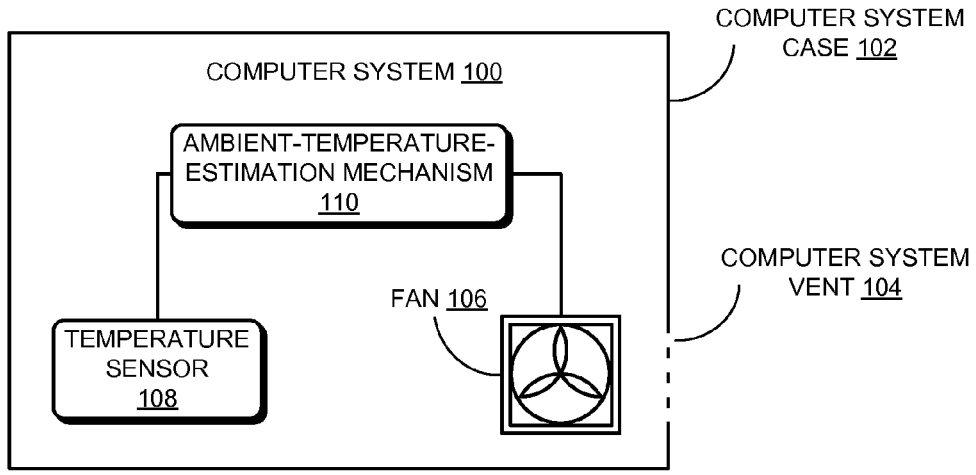
FIG. 1 represents a system that estimates an ambient temperature of air outside of a computer system in accordance with some embodiments of the present invention.

FIG. 1 represents a system that estimates an ambient temperature of air outside of a computer system in accordance with some embodiments of the present invention. Computer system 100 includes computer system case 102, computer system vent 104, fan 106, temperature sensor 108, and ambient-temperature-estimation mechanism 110. Ambient-temperature-estimation mechanism 110 is coupled to fan 106 and temperature sensor 108.

Computer system 100 can include but is not limited to a server, a server blade, a data center server, an enterprise computer, a field-replaceable unit that includes a processor, or any other computation system that includes one or more processors and one or more cores in each processor.

Computer system case 102 encloses computer system 100 and includes computer system air vent 104 to allow air to flow between the inside and outside of computer system case 102.

Computer system air vent 104 can include but is not limited to any opening in computer system case 102 that allows air to flow between the inside and outside of a computer system case.

Fan 106 can include any type of fan, including but not limited to a case fan for computer system 100, or any other fan in a computer system that can move air into computer system case 102 through computer system vent 104. Fan 106 sends a signal to ambient-temperature-estimation mechanism 110 related to an air flow into computer system case 102 generated by fan 106. The signal sent by fan 106 to ambient-temperature-estimation mechanism 110 can include but is not limited to: an electrical current drawn by fan 106, an electrical power used by fan 106, or a speed of fan 106.

Temperature sensor 108 is any device that can sense the ambient temperature inside computer system 100 and send a signal related to the sensed ambient temperature inside computer system 100 to ambient-temperature-estimation mechanism 110. Note that temperature sensor 108 can be implemented in any technology now known or later developed.

Ambient-temperature-estimation mechanism 110 can include any mechanism that can receive a signal related to a sensed temperature from temperature sensor 108, receive a signal from fan 106 related to an air flow into computer system case 102 generated by fan 106, and estimate the ambient temperature of air outside computer system 100 in accordance with embodiments of the present invention. Moreover, ambient-temperature-estimation mechanism 110 can be implemented in any combination of hardware and software. In some embodiments, ambient-temperature-estimation mechanism 110 operates on a processor in computer system 100. In other embodiments, ambient-temperature-estimation mechanism 110 operates on one or more service processors. In still other embodiments, ambient-temperature-estimation mechanism 110 is located outside of computer system 100. In yet other embodiments, ambient-temperature-estimation mechanism 110 operates on a separate computer system.

Some embodiments of the present invention operate as follows. When computer system 100 is switched on, ambient-temperature-estimation mechanism 110 controls fan 106 to sweep the speed of fan 106 from a maximum fan speed to a nominal operating fan speed. While the speed of fan 106 is conducting the sweep, ambient-temperature-estimation mechanism 110 receives information from temperature sensor 108 related to the ambient temperature in computer system case 102, and information from fan 106 related to the air flow into computer system case 102 generated by fan 106. Ambient-temperature-estimation mechanism 110 then creates a numeric functional from the relationship between the temperature information received from temperature sensor 108 and the reciprocal of the information related to air flow into system case 102 received from fan 106. Ambient-temperature-estimation mechanism 110 then estimates the ambient temperature of air outside computer case 102 by numerically computing the ambient temperature inside computer system case 102 for an air flow approaching infinity based on projecting the relationship between the ambient temperature inside computer case 102 and the reciprocal of the information from fan 106 related to the air flow. The computed ambient temperature inside computer system case 102 for an air flow approaching infinity is then used as an estimate for the ambient temperature of air outside computer system 100.

Figure 2:
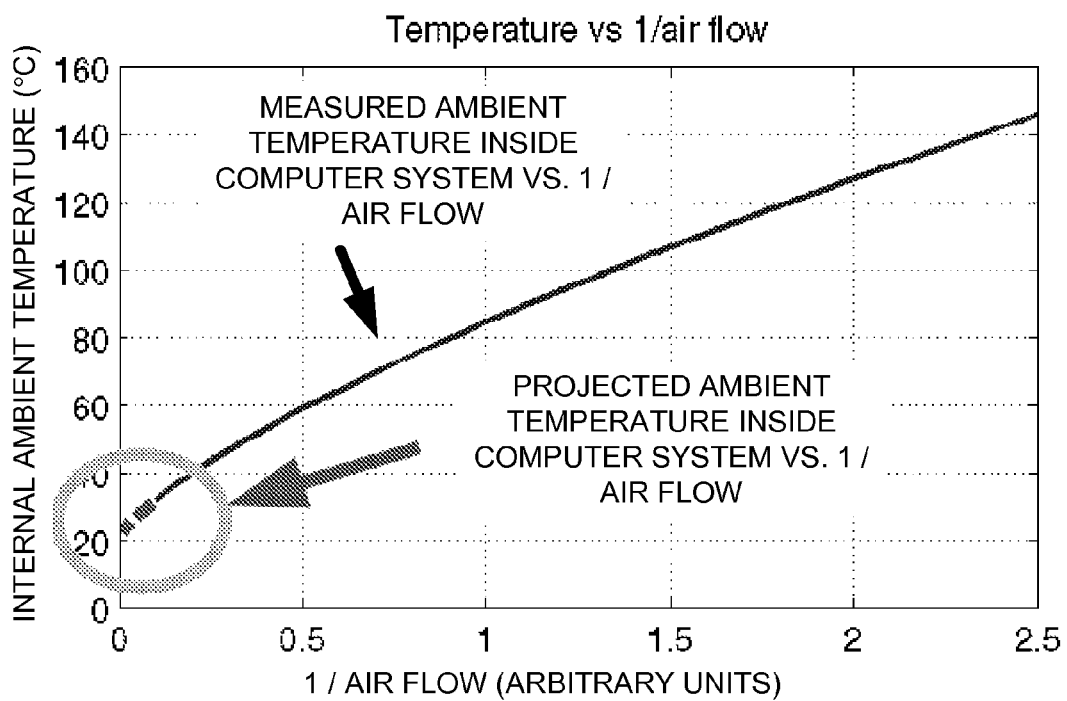
FIG. 2 is a graph of the ambient temperature inside a computer system case vs. the reciprocal of air flow into the case, and the projected ambient temperature inside the case as the air flow into the case approaches an infinite air flow in accordance with some embodiments of the present invention.

FIG. 2 is a graph of the ambient temperature inside a computer system case vs. the reciprocal of air flow into the case, and the projected ambient temperature inside the case as the air flow into the case approaches an infinite air flow in accordance with some embodiments of the present invention.

As depicted in FIG. 2, the measured ambient temperature inside a computer system is plotted vs. the reciprocal of the air flow into the computer system case. In FIG. 2, the ambient temperature inside the case is projected, as shown in red, for air flows higher than the maximum measured air flow. Note that the estimated ambient temperature of air outside of the computer system is equal to the projected ambient temperature inside the computer system case for an infinite air flow into the computer system case. For example, in FIG. 2 the estimated ambient temperature of air outside the computer system case is about 20° C.

Referring back to FIG. 1, in some embodiments, the flow rate of air into computer system case 102 is directly measured or inferred, and a signal related to the directly measured or inferred air flow rate is sent to ambient-temperature-estimation mechanism 110 instead of the signal from fan 106.

In some embodiments, ambient-temperature-estimation mechanism 110 does not sweep the speed of fan 106 from a maximum fan speed to a nominal operating fan speed during the ambient-temperature-estimation process described above. In these embodiments, fan 106 is caused to sweep in speed by some other process in computer system 100. In some embodiments, fan 106 is caused to sweep in speed by ambient-temperature-estimation mechanism 110 during a phase of operation of computer system 100 other than when computer system 100 is switched on. In some embodiments the speed of fan 106 is swept from a nominal operating speed to a maximum fan speed, while in other embodiments, the speed of fan 106 is controlled to achieve fan speeds that range from the maximum fan speed to a nominal fan speed in a predetermined order.

In some embodiments, the ambient-temperature-estimation process described above occurs every time computer system 100 is switched on. In other embodiments, the ambient-temperature-estimation process described above occurs when a configuration of computer system 100 has changed, for example when a memory or a board in computer system 100 has been changed. In some embodiments, the relationship between the ambient temperature inside computer system case 102 and the reciprocal of the fan speed is stored for each estimate of the ambient temperature of air outside of the computer system. In some embodiments, the relationship between the ambient temperature inside computer case 102 and the reciprocal of the fan speed is stored when an estimated ambient temperature of air outside computer system 100 is different from a previously estimated ambient temperature outside computer system 100 by more than a predetermined amount. In some embodiments the predetermined amount is 1° C. In some embodiments, the ambient temperature of air outside computer system 100 is determined based on fitting the signal from fan 106 related to the air flow into computer system 100 and the temperature signals received from temperature sensor 108 to a previously stored relationship, and using the ambient temperature of air outside computer system 100 from the previously stored relationship.

Figure 3:
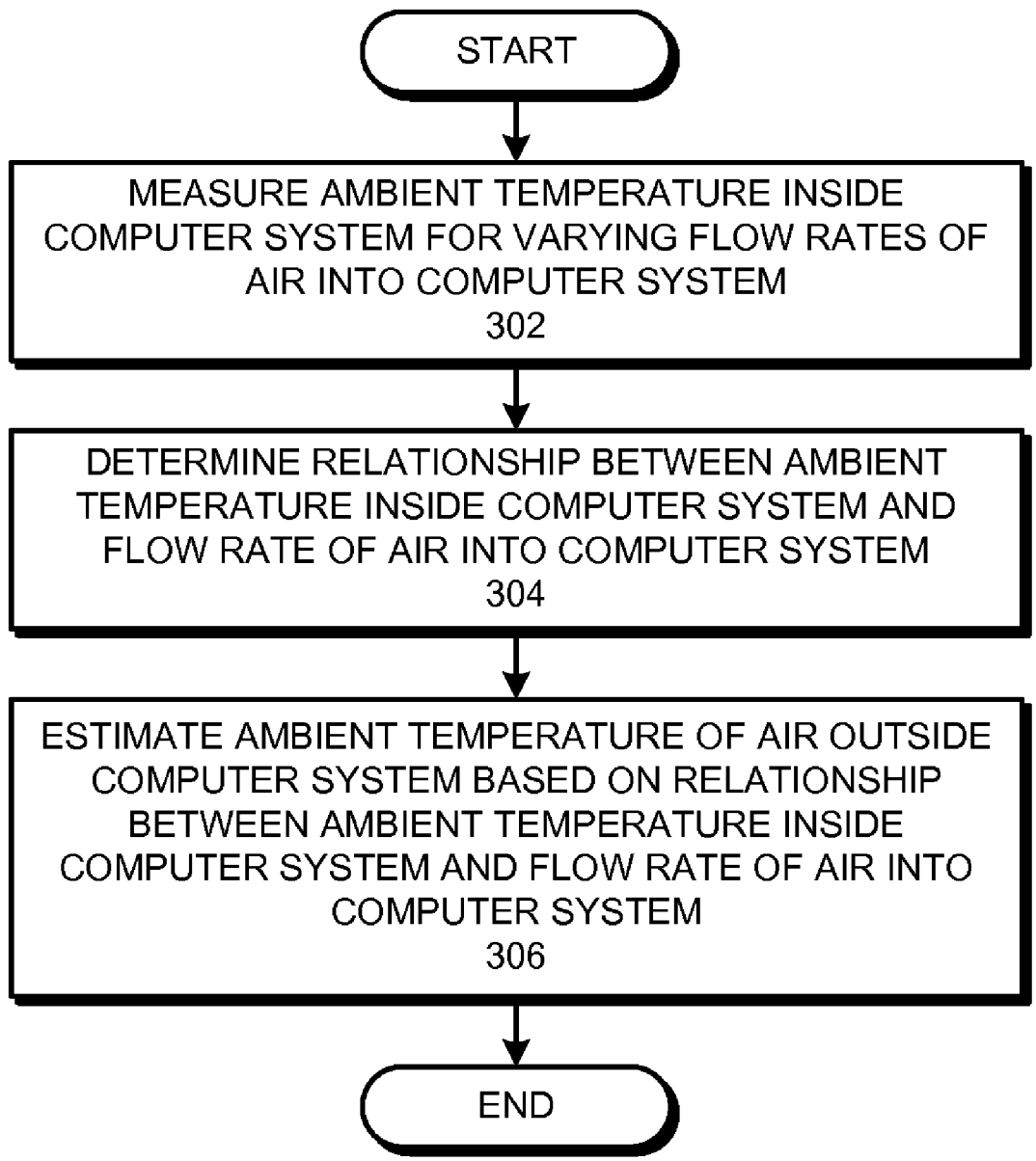
FIG. 3 presents a flowchart illustrating a process for estimating an ambient temperature of air outside of a computer system in accordance with some embodiments of the present invention.

FIG. 3 presents a flowchart illustrating a process for estimating an ambient temperature of air outside of a computer system in accordance with some embodiments of the present invention. First, the ambient temperature inside a computer system is measured for varying flow rates of air into the computer system (step 302). Next, the relationship between the ambient temperature inside the computer system and the flow rate of air into the computer system is determined (step 304). In some embodiments, the relationship between the ambient temperature inside the computer system and the flow rate of air into the computer system includes a relationship between the ambient temperature inside the computer system and the reciprocal of the flow rate of air into the computer system. Then, the ambient temperature of air outside the computer system is estimated based on the relationship between the ambient temperature inside the computer system and the flow rate of air into the computer system (step 306).

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for estimating an ambient temperature of air outside of a computer system, the method comprising:
    measuring a temperature inside the computer system for different flow rates of air into the computer system, wherein the different flow rates of air include a maximum flow rate of air into the computer system;
    using the temperature measurements to determine a relationship between the temperature inside the computer system and a parameter related to flow rate of air into the computer system; and
    using a computer to estimate the ambient temperature of air outside the computer system based on the relationship, wherein estimating the ambient temperature includes projecting the temperature inside the computer system for an airflow rate higher than the maximum flow rate.

2. The method of claim 1, further comprising:
    storing information based on the relationship between the temperature inside the computer system and the parameter related to the flow rate of air into the computer system.

3. The method of claim 1, wherein the parameter related to the flow rate of air includes at least one of:
    a speed of a fan in the computer system;
    a current used by the fan;
    a power used by the fan;
    a measured flow rate of air into the computer system; and
    an inferred flow rate of air into the computer system.

4. The method of claim 1,
    wherein the parameter related to the flow rate of air into the computer system is a parameter related to a reciprocal of the flow rate of air into the computer system; and
    wherein estimating the ambient temperature of air outside the computer system includes estimating the ambient temperature of air outside the computer system based on the relationship between the temperature inside the computer system and the parameter related to the reciprocal of the flow rate of air.

5. The method of claim 1, wherein:
    measuring the temperature inside the computer system for different flow rates of air into the computer system includes measuring the temperature inside the computer system for different flow rates of air into the computer system when the computer system is switched on.

6. The method of claim 1, wherein:
    measuring the temperature inside the computer system for different flow rates of air into the computer system includes measuring the temperature inside the computer system for different flow rates of air into the computer system when a configuration of the computer system is changed.

7. A non-transitory computer-readable storage medium storing instructions that when executed by a computer cause the computer to perform a method for estimating an ambient temperature of air outside of a computer system, the method comprising:
    measuring a temperature inside the computer system for different flow rates of air into the computer system, wherein the different flow rates of air include a maximum flow rate of air into the computer system;
    using the temperature measurements to determine a relationship between the temperature inside the computer system and a parameter related to flow rate of air into the computer system; and
    estimating the ambient temperature of air outside the computer system based on the relationship, wherein estimating the ambient temperature includes projecting the temperature inside the computer system for an airflow rate higher than the maximum flow rate.

8. The non-transitory computer-readable storage medium of claim 7, further comprising:
    storing information based on the relationship between the temperature inside the computer system and the parameter related to the flow rate of air into the computer system.

9. The non-transitory computer-readable storage medium of claim 7, wherein the parameter related to the flow rate of air includes at least one of:
    a speed of a fan in the computer system;
    a current used by the fan;
    a power used by the fan;
    a measured flow rate of air into the computer system; and
    an inferred flow rate of air into the computer system.

10. The non-transitory computer-readable storage medium of claim 7,
    wherein the parameter related to the flow rate of air into the computer system is a parameter related to a reciprocal of the flow rate of air into the computer system; and
    wherein estimating the ambient temperature of air outside the computer system includes estimating the ambient temperature of air outside the computer system based on the relationship between the temperature inside the computer system and the parameter related to the reciprocal of the flow rate of air.

11. The non-transitory computer-readable storage medium of claim 7, wherein:
    measuring the temperature inside the computer system for different flow rates of air into the computer system includes measuring the temperature inside the computer system for different flow rates of air into the computer system when the computer system is switched on.

12. The non-transitory computer-readable storage medium of claim 7, wherein:
    measuring the temperature inside the computer system for different flow rates of air into the computer system includes measuring the temperature inside the computer system for different flow rates of air into the computer system when a configuration of the computer system is changed.

13. An apparatus that estimates an ambient temperature of air outside of a computer system, the apparatus comprising:
    a measuring mechanism configured to measure a temperature inside the computer system for different flow rates of air into the computer system, and further configured to measure a maximum flow rate of air into the computer system;
    a determining mechanism configured to use the temperature measurements to determine a relationship between the temperature inside the computer system and a parameter related to flow rate of air into the computer system; and an estimating mechanism configured to estimate the ambient temperature of air outside the computer system based on the relationship, and further configured to project the temperature inside the computer system for an airflow rate higher than the maximum flow rate.

14. The apparatus of claim 13, further comprising:
a storing mechanism configured to store information based on the relationship between the temperature inside the computer system and the parameter related to the flow rate of air into the computer system.

15. The apparatus of claim 13, wherein the parameter related to the flow rate of air includes at least one of:
a speed of a fan in the computer system;
a current used by the fan;
a power used by the fan;
a measured flow rate of air into the computer system; and
an inferred flow rate of air into the computer system.

16. The apparatus of claim 13,
wherein the parameter related to the flow rate of air into the computer system is a parameter related to a reciprocal of the flow rate of air into the computer system; and
wherein the estimating mechanism is configured to estimate the ambient temperature of air outside the computer system based on the relationship between the temperature inside the computer system and the parameter related to the reciprocal of the flow rate of air.

17. The apparatus of claim 13, wherein:
the measuring mechanism measures the temperature inside the computer system for different flow rates of air into the computer system when the computer system is switched on.

* * * * *